UNITED STATES PATENT OFFICE 2,251,236

DOUBLE COMPOUND OF PENTAERYTHRITOL AND DIPENTAERYTHRITOL

Joseph A. Wyler and Edwin A. Wernett, Allentown, Pa., assignors to Trojan Powder Company, Allentown, Pa.

No Drawing. Application March 28, 1940, Serial No. 326,380

3 Claims. (Cl. 260—615)

Our invention relates to a composition of matter. More particularly it relates to a double compound consisting of one molecule of dipentaerythritol and 4 molecules of pentaerythritol.

In our copending application S. N. 309,352 we disclose a process for the preparation of high melting-point pentaerythritol and also refer to a double compound of melting range 185-190° C. It is the purpose of the present application specifically to claim this new composition of matter.

Commercial pentaerythritol, at the present time, is manufactured from formaldehyde and acetaldehyde by condensation in alkaline media, and is of varying degrees of purity. Commercial samples vary in melting point from about 200° to about 253° C. and contain from 15-3% of dipentaerythritol as an impurity.

It is a purpose of our invention to prepare a pentaerythritol-dipentaerythritol compound of definite proportions, that is, 4 molecules of pentaerythritol and one molecule of dipentaerythritol. Other purposes will become apparent upon a perusal of this specification.

As mentioned above, commercial pentaerythritol is essentially a mixture of pentaerythritol [(CH$_2$OH)$_4$C] and dipentaerythritol

[(CH$_2$OH)$_3$·C·CH$_2$·O·CH$_2$·C·(CH$_2$OH)$_3$]

in varying proportions. The melting point of pure pentaerythritol is 260.5° C. and of pure dipentaerythritol, 221° C. Our compound is obtained from aqueous media, melts at about 185-190° C. and contains about 69-72% pentaerythritol and 31-28% dipentaerythritol We have discovered that pentaerythritol and dipentaerythritol form at least two double compounds with each other in water solutions. One of these has a melting range of about 185-190° C. and consists of approximately 30% dipentaerythritol and 70% pentaerythritol. This double compound is very stable and does not decompose in hot water solution, as is shown by the fact that it may be repeatedly crystallized out of hot water solutions without undergoing any decomposition. The other double compound is unstable in hot (above 65°-70° C.) water solutions. Consequently if a water solution of pentaerythritol and dipentaerythritol containing more than about 70 parts of pentaerythritol for 30 parts of dipentaerythritol is evaporated at temperatures above 65-70° C. and the crystals allowed to separate above this point, the crystals will have a melting point greater than 250° C., provided the concentration of the solution is not allowed to exceed the solubility at 65-70° C. of the low-melting-point double compound.

In order more clearly to point out our invention we give the following example (in which all parts are by weight):

Example

About 100 parts of crude pentaerythritol (melting point 235-244° C.) are dissolved in 200 parts of hot water contained in a steam jacketed kettle. The solution is treated with a small amount of decolorizing charcoal, stirred and filtered. The clear, colorless filtrate is run into another steam jacketed kettle in which the solution is boiled down until a relatively thick mush of pentaerythritol crystals has separated. The latter are then discharged into a hot (above 70° C.) centrifugal and whizzed to a low moisture content. The contents of the centrifugal may then be given a rapid warm water or propyl alcohol wash. The centrifuged product is then removed and dried at about 100° C. This product will be snow white and have a melting point higher than 250° C. The mother liquor is again heated to boiling and evaporated at above 70° C. until a distinct milkiness makes its appearance. The mixture is filtered hot (about 70° C.) and the filtrate allowed to cool with stirring, to room temperature. A substantial crop of elongated, feathery crystals is obtained from this filtrate. These crystals upon washing with water and drying have a melting range of about 185-190° C. and are our double compound. This compound may be repeatedly crystallized from hot water to effect further purification when desired. The mother liquor may be further evaporated in order to obtain a more complete recovery of our compound or it may be used over again with a succeeding batch.

The process just described represents one method for the preparation of our double compound. It is preferred because it enables us to separate commercial pentaerythritol into two valuable products: one melting at 250°+ C. and the other at 185-190° C.

We may, of course, modify our process for the preparation of our double compound in any manner that would occur to a person skilled in this art.

In order more clearly to point out our composition of matter the following characteristics are presented. It melts at about 185-190° C., is stable in water solutions up to temperatures at least as high as 106° C., usually separates as elongated crystals, appears to be more soluble in water than is pentaerythritol or dipentaerythritol and has the composition $$[(CH_2OH)_3 \cdot C \cdot CH_2 \cdot O \cdot H_2C \cdot C(CH_2OH)_3] \cdot 4C(CH_2OH)_4$$

This formula for our double compound has been arrived at by first nitrating our dried product, determining the nitrogen content of the nitrated product, calculating the percentage of pentaerythritol tetranitrate and dipentaerythritol hexanitrate in it from this nitrogen content, then calculating the pentaerythritol and dipentaerythritol equivalent to this pentaerythritol tetranitrate and dipentaerythritol hexanitrate respectively and finally calculating the percentage composition. The molecular composition was calculated, from the percentage composition. Thus, the nitrogen content (by means of the nitrometer) of the nitrated product obtained from our double compound was found to be 17.24% nitrogen (average of 17.24, 17.18, 17.30, 17.24). The theoretical nitrogen content of pentaerythritol tetranitrate is 17.73% nitrogen and of dipentaerythritol hexanitrate is 16.03%. This calculates to a mixture consisting of:

| | Percent |
|---|---|
| Dipentaerythritol hexanitrate | 28.82 |
| Pentaerythritol tetranitrate | 71.18 |
| | 100.00 | and this in turn calculates to its equivalent:

| | Percent |
|---|---|
| Dipentaerythritol | 31.3 |
| Pentaerythritol | 68.7 |
| | 100.0 |

Since the molecular weight of dipentaerythritol is 254.18 and of pentaerythritol, 136.09, the molecular proportion is as 0.12 is to 0.50 or about 1:4 of dipentaerythritol to pentaerythritol.

Further confirmation that our double compound consists of pentaerythritol and dipentaerythritol has been obtained by nitrating it and separating the nitrated product into pentaerythritol tetranitrate and dipentaerythritol hexanitrate by means of fractional precipitation from acetone solution through the dropwise addition of water.

Our new composition of matter has usefulness as a raw material for the preparation of explosive compositions, and has the advantage of providing a material of constant and definite composition, thus yielding, upon nitration, a uniform explosive of specific, duplicatable properties. Also, our double compound is useful for the preparation of esters and resinous compositions for lacquers and plastics.

We wish to emphasize that due to the difficulties involved in the analysis of our product and that an error of only 0.1% in the nitrogen determination causes a relatively large error in the percentage composition of our double compound, we are giving ranges in the percentage composition of our double compound even though a given chemical compound can have but one specific percentage composition.

We claim:

1. A pentaerythritol product comprising essentially the compound of the formula $$(CH_2OH)_3C \cdot CH_2 \cdot O \cdot CH_2 \cdot C(CH_2OH)_3 \cdot 4C(CH_2OH)_4$$

2. A composition of matter consisting of 69–72% of pentaerythritol and 31–28% dipentaerythritol, said pentaerythritol and dipentaerythritol being present as a double compound.

3. A double compound of pentaerythritol and dipentaerythritol melting at about 185–190° C. and forming, upon complete nitration, a nitrated product containing about 17.24% nitrogen.

JOSEPH A. WYLER.
EDWIN A. WERNETT.